US012342014B2

United States Patent
Stewart (10) Patent No.: US 12,342,014 B2
(45) Date of Patent: *Jun. 24, 2025

(54) METHOD USING ADAPTIVE-BIT-RATE PLAYLISTS FOR DYNAMIC SERVER CAPACITY AND BROADBAND HANDOVERS

(71) Applicant: World Multicast, Inc., Danville, CA (US)

(72) Inventor: Ian Alban Stewart, Ventura, CA (US)

(73) Assignee: World Multicast, Inc., Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,610

(22) Filed: Oct. 16, 2023

(65) Prior Publication Data

US 2024/0267576 A1  Aug. 8, 2024

Related U.S. Application Data

(63) Continuation of application No. 16/837,877, filed on Apr. 1, 2020, now Pat. No. 11,792,454.

(60) Provisional application No. 62/827,704, filed on Apr. 1, 2019.

(51) Int. Cl.
*H04N 7/16* (2011.01)
*H04L 45/74* (2022.01)
*H04N 21/238* (2011.01)
*H04N 21/2381* (2011.01)

(52) U.S. Cl.
CPC ....... *H04N 21/23805* (2013.01); *H04L 45/74* (2013.01); *H04N 21/2381* (2013.01)

(58) Field of Classification Search
CPC .......... H04N 21/23805; H04N 21/2381; H04L 45/74
See application file for complete search history.

(56) References Cited

U.S. PATENT DOCUMENTS

| | | |
|---|---|---|
| 2005/0128979 A1 | 6/2005 | Wu et al. |
| 2005/0286466 A1 | 12/2005 | Tagg et al. |
| 2007/0091907 A1 | 4/2007 | Seshadri et al. |
| 2013/0007814 A1 | 1/2013 | Cherian et al. |
| 2013/0286868 A1 | 10/2013 | Oyman et al. |
| 2015/0029865 A1* | 1/2015 | Drobinsky ............... H04L 47/12 370/238 |
| 2015/0063346 A1 | 3/2015 | Eswara et al. |
| 2015/0067819 A1 | 3/2015 | Shribman et al. |
| 2015/0127721 A1* | 5/2015 | Bergman ............ H04L 12/5691 709/203 |
| 2015/0319644 A1 | 11/2015 | Grunenberger et al. |
| 2016/0112953 A1 | 4/2016 | Go et al. |
| 2016/0127891 A1 | 5/2016 | Nylander et al. |
| 2016/0142321 A1 | 5/2016 | Gage |

(Continued)

*Primary Examiner* — Annan Q Shang
(74) *Attorney, Agent, or Firm* — Benedict R. Dugan; Lowe Graham Jones PLLC (57) ABSTRACT

A method of using HLS (or DASH) server emulation to implement dynamic server capacity using point-to-multipoint or point-to-point Internet communication protocols. In a wireless handover setting, this system utilizes network address translators running on distributed gateways or tower infrastructure. The system uses adaptive bit rate emulated servers to effectively update and resynthesize playlist files for dynamic adaptive-bit-rate HLS playback.

20 Claims, 8 Drawing Sheets

(56) References Cited

U.S. PATENT DOCUMENTS

| | | | |
|---|---|---|---|
| 2016/0164860 A1* | 6/2016 | Dunne | H04L 63/0815 |
| | | | 726/8 |
| 2016/0269926 A1* | 9/2016 | Sundaram | H04L 41/5054 |
| 2016/0337426 A1 | 11/2016 | Shribman et al. | |
| 2016/0373372 A1 | 12/2016 | Gillon et al. | |
| 2017/0134274 A1* | 5/2017 | Araújo | H04L 45/74 |
| 2018/0084018 A1 | 3/2018 | Arky | |
| 2019/0373301 A1 | 12/2019 | Gunasekara et al. | |
| 2020/0267437 A1 | 8/2020 | Pantos | |

* cited by examiner

Adaptive HLS Playlist

```
HTTP/1.1 200 OK
Date: Tue, 11 Jul 2017 16:33:20 GMT
Cache-Control: no-cache
Server: Apache
Content-Type: application/x-mpegURL
Access-Control-Allow-Origin: *
Content-Length: 286
Connection: Keep-Alive

#EXTM3U
#EXT-X-STREAM-INF:BANDWIDTH=400000,CODECS="mp4a.40.2,
avc1.640015",RESOLUTION=720x480
http://22.xx.xx.1:80/Bobs_TTTV-Bobs_TTTV_Low.m3u8
#EXT-X-STREAM-INF:BANDWIDTH=1000000,CODECS="mp4a.40.2,
avc1.640015",RESOLUTION=720x480
http://22.xx.xx.1:80/Bobs_TTTV-Bobs_TTTV_High.m3u8
```

Bobs_TTTV-Bobs_TTTV_Low.m3u8

```
#EXTM3U
#EXT-X-TARGETDURATION:4
#EXT-X-VERSION:3
#EXT-X-MEDIA-SEQUENCE:5757
#EXTINF:4
http://23.xx.xx.10:80/media/224.0.22.170/stream_media_5757.ts
#EXTINF:4
http://23.xx.xx.10:80/media/224.0.22.170/stream_media_5758.ts
#EXTINF:4
http://23.xx.xx.10:80/media/224.0.22.170/stream_media_5759.ts
#EXTINF:4
http://23.xx.xx.10:80/media/224.0.22.170/stream_media_5760.ts
#EXTINF:4
http://23.xx.xx.10:80/media/224.0.22.170/stream_media_5761.ts
```

Adaptive HLS Playlist

```
HTTP/1.1 200 OK
Date: Tue, 11 Jul 2017 16:13:20 GMT
Cache-Control: no-cache
Server: Apache
Content-Type: application/x-mpegURL
Access-Control-Allow-Origin: *
Content-Length: 286
Connection: keep-alive

#EXTM3U
#EXT-X-STREAM-INF:BANDWIDTH=400000,CODECS="mp4a.40.2,
avc1.64001f",RESOLUTION=720x480
http://22.xx.xx.1:80/Bobs_TTTV-Bobs_TTTV_Low.m3u8
#EXT-X-STREAM-INF:BANDWIDTH=1000000,CODECS="mp4a.40.2,
avc1.64001f",RESOLUTION=720x480
http://22.xx.xx.1:80/Bobs_TTTV-Bobs_TTTV_High.m3u8
```

Bobs_TTTV-Bobs_TTTV_Low.m3u8 after Handover

```
#EXTM3U
#EXT-X-TARGETDURATION:4
#EXT-X-VERSION:3
#EXT-X-MEDIA-SEQUENCE:5757
#EXTINF:4
http://24.xx.xx.20:80/media/224.0.22.170/stream_media_5757.ts
#EXTINF:4
http://24.xx.xx.20:80/media/224.0.22.170/stream_media_5758.ts
#EXTINF:4
http://24.xx.xx.20:80/media/224.0.22.170/stream_media_5759.ts
#EXTINF:4
http://24.xx.xx.20:80/media/224.0.22.170/stream_media_5760.ts
#EXTINF:4
http://24.xx.xx.20:80/media/224.0.22.170/stream_media_5761.ts
```

METHOD USING ADAPTIVE-BIT-RATE PLAYLISTS FOR DYNAMIC SERVER CAPACITY AND BROADBAND HANDOVERS

PRIORITY CLAIM

This application is a continuation of U.S. patent application Ser. No. 16/837,877 filed Apr. 1, 2020; which claims the benefit of priority from U.S. Provisional Patent Application No. 62/827,704 filed Apr. 1, 2019, the contents of which are incorporated by reference.

FIELD OF THE INVENTION

The field of the invention relates to the use of dynamic bandwidth consumption by Internet media distribution systems, specifically hyper-text transfer protocol live streaming (HLS) and Moving Picture Experts Group dynamic adaptive streaming (DASH).

BACKGROUND OF THE INVENTION

For Internet media delivery of live content there are two dominant adaptive-bit-rate rivals. Hyper-Text Transfer Protocol Live Stream (HLS), and Moving Picture Experts Groups Dynamic Adaptive Streaming over HTTP (DASH).

In HLS (and DASH) the end user media player is pointed through a discovery process to an adaptive-bit-rate playlist server, which sends multi-bit-rate playlists and associated video segments. This process leaves the end user's media player logically in charge of which playlist segments will optimize available bandwidth. As soon as the end user's playback commences, the playlist server's address is fixed (static).

Large interactive data structures are increasingly distributed geographically to towers or gateways to improve user response times. Consequently, tower or gateways could include adaptive bit rate servers to increase efficiency. Media distributing systems are more efficient when they use adaptive bit rate HLS (or DASH). Adaptive bit rate media delivery requires transferring control to the end users media player in order to optimize available bandwidth. Once control has been handed to the media player, the server for the player is fixed (static), enabling the player to optimize available bandwidth.

If viewers are streaming live media from all the gateways or towers, it would be very efficient to use point-to-multipoint communications protocols like IP Multicast and start an HLS (or DASH) server on each tower. However, television viewing habits are largely dynamic.

The requisite is to create dynamic adaptive bit rate servers while leaving the adaptive bit rate players in control to optimize bandwidth. Therefore, any solution must be be implemented on the server side.

The media players decide where to request playlists getting their initial base level information from a discoverable host; usually a web page pointing to the playlist file. Modern systems use geographic location to find the closest adaptive-bit-rate servers. Once this determination has been made, the media player continues to make additional requests from the same playlist server until the user is finished watching the content.

The dependency of adaptive-bit-rate on this discovery mechanism presents a challenge to applying a distributed model to adaptive-servers. The end user's player has no way to find the closest playlist server in mid-stream. For example, in the case where a cellular operator had implemented an efficient IP Multicast to distribute to towers and a cellular end user had initiated the playing of a popular live sporting event, when the handover to a second tower occurred the system would continue to request from the first tower, creating back haul congestion. Consequently, instantiating adaptive bit rate servers at towers or gateways, even the ideal situation (where every tower or gateway has a user viewing the same content), yields an imperfect result. Without a solution, network engineers simply decided to throw bandwidth at the live video streaming problem.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The present invention is a method of using HLS (or DASH) server emulation to implement dynamic server capacity using point-to-multipoint or point-to-point Internet communication protocols. In a wireless handover setting, this system utilizes network address translators running on distributed gateways or tower infrastructure. The system uses adaptive bit rate emulated servers to effectively update and resynthesize m3u8 playlist files for dynamic adaptive-bit-rate HLS playback.

Figure 1A:
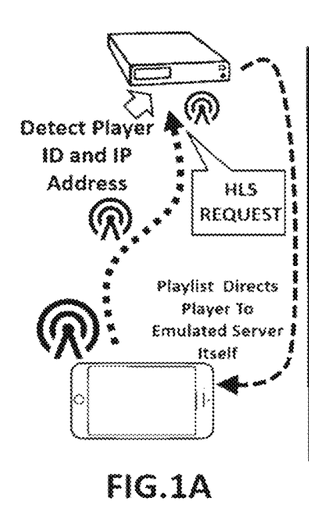
FIG. 1A illustrates a system including a representative user and emulated server.
Figure 1B:
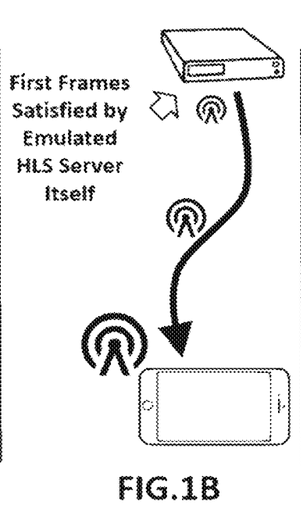
FIG. 1B illustrates the system of FIG. 1A, indicating the service of initial frames by the emulated server.
Figure 1C:
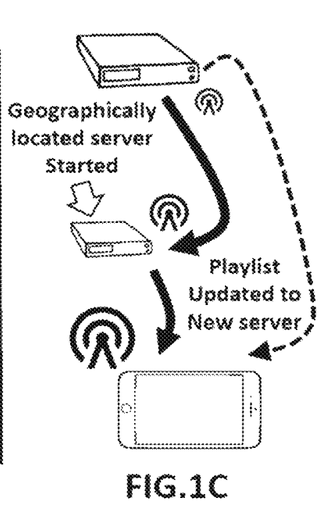
FIG. 1C illustrates the system of FIG. 1A, indicating service of subsequent frames in a dynamic fashion.

In preferred versions, the present invention incorporates emulated adaptive-bit-rate playlist servers (HLS or DASH) which detect the end user's player identification and Internet protocol address, as indicated in FIG. 1A. The emulated server's first playlist request, or requests where the players location has changed, are served by the emulated server itself, as indicated in FIG. 1B, and then in subsequent requests by tracking each individual playlist request, sequencing customized playlist responses, and dynamically updating the playlists with geographically located adaptive-bit-rate segment servers. The system operator is thus able to implement dynamic downstream, geographically optimized adaptive-bit-rate server capacity, which also responds dynamically to outages, increased/decreased system load, and/or wireless (tower) handovers, as indicated in FIG. 1C.

Because the end-users media player is unknowing of the playlist updates, it is able to play video seamlessly without interruption during the entire process.

The invention preferably incorporates the coding of an efficient http server which is designed to emulate an adaptive bit rate server. The end user player is not aware it is communicating with an emulated server which is incorporated to allow the updating of the adaptive bit rate playlist. End user media players are standard features of devices such as those using IOS and Android, and desktop implementations commonly follow the lead of the mobile devices as the installed base is far greater.

The end user media players request a playlist of transport stream (ts) segments. Then after considering the bandwidth the adaptive bit rate media player requests a size of ts segment that fits the end users final mile connectivity. For this invention to function at peak efficiency, it preferably uses a secure, reliable, quality of service and audience accountable point-to-multipoint communication protocol.

Figure 2:
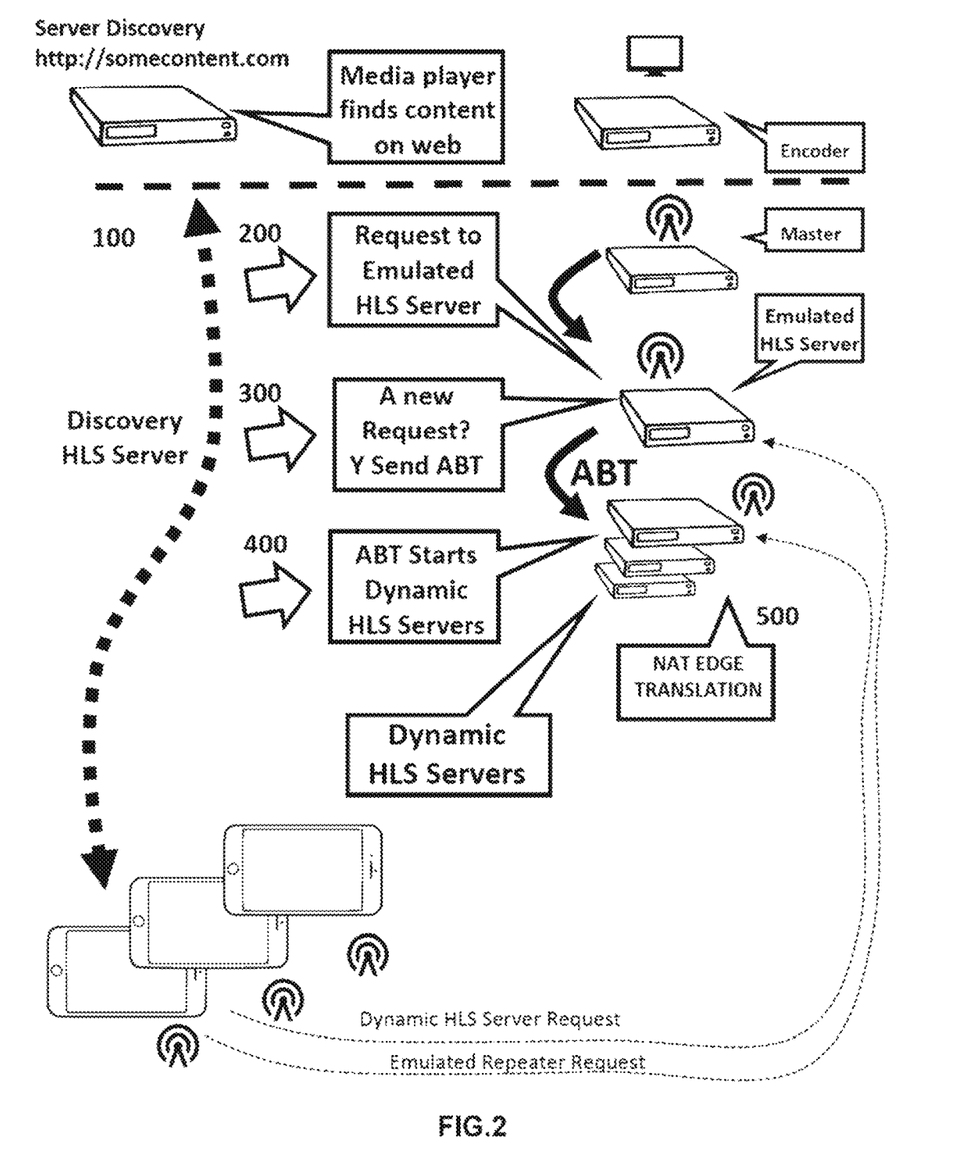
FIG. 2 is a block diagram of a system in accordance with the present invention.
Figure 3A:
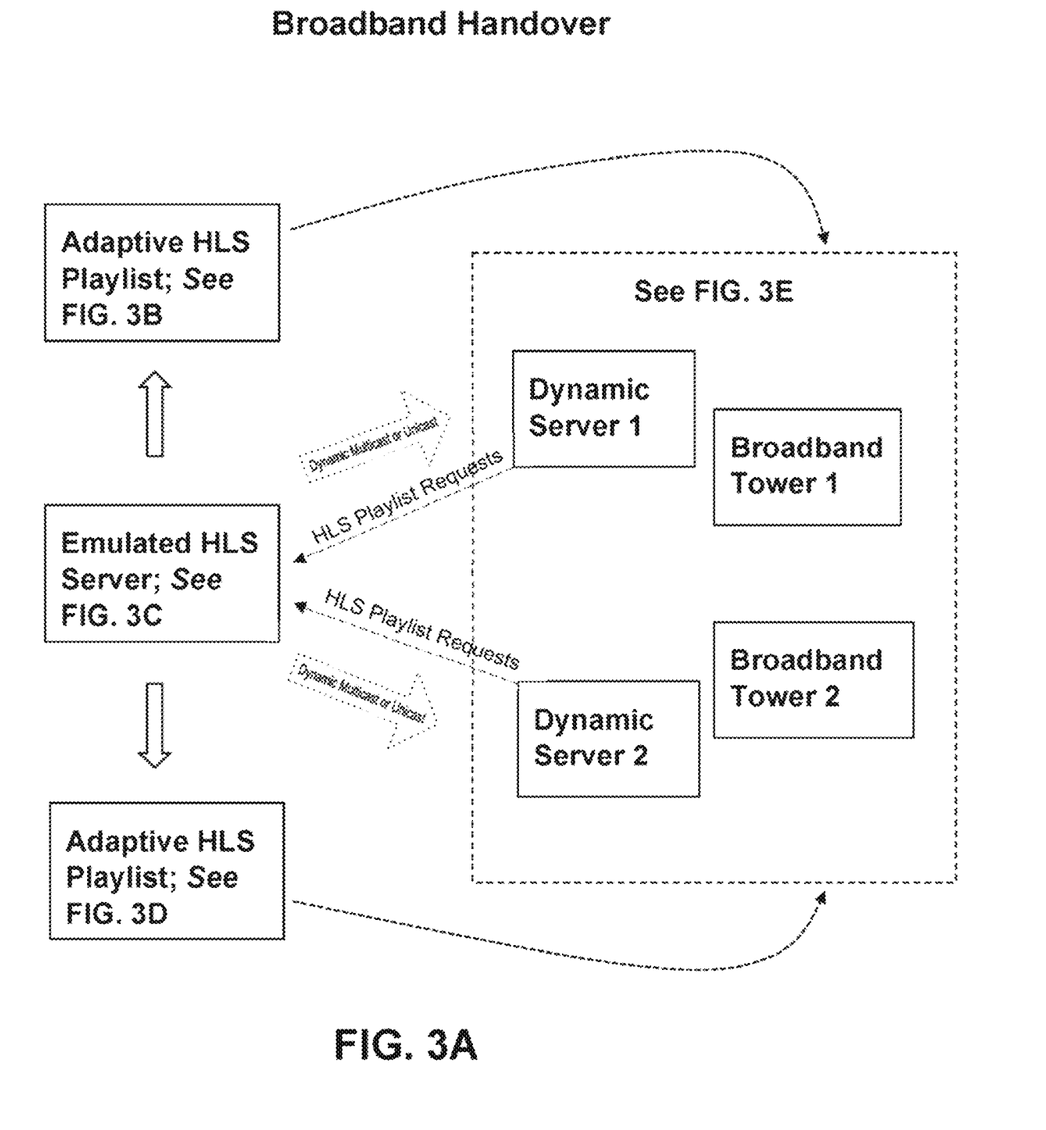
FIG. 3A is a representative illustration of a wireless handover of steam that is currently running on two dynamically instantiated adaptive bit rate servers, and with reference to FIGS. 3B-3E for clarity of illustration
Figure 3B:
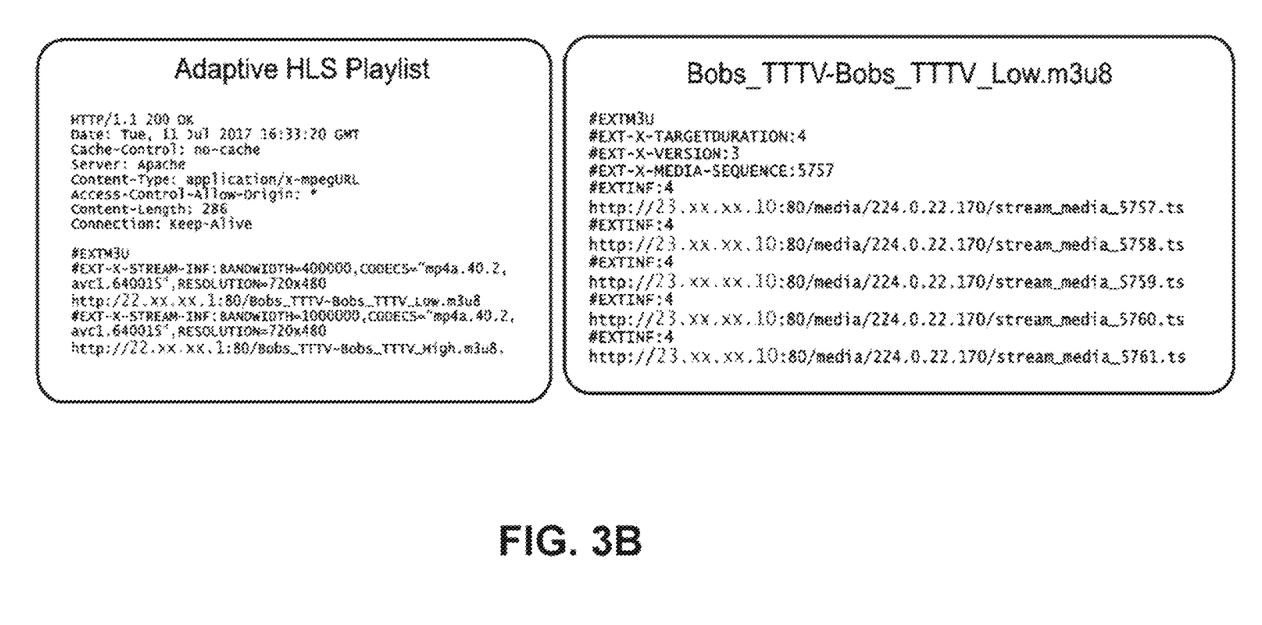
FIG. 3B is a representative illustration of an adaptive HLS playlist to be returned by an emulated HLS server.
Figure 3C:
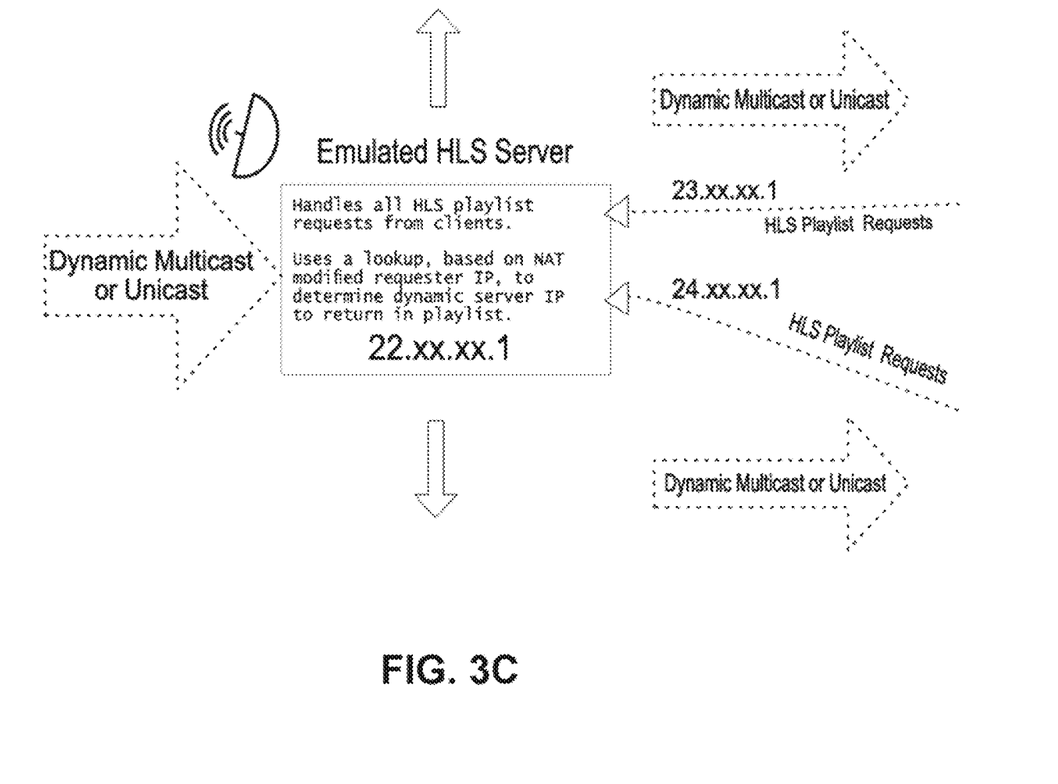
FIG. 3C is a representative illustration of an emulated HLS server.
Figure 3D:
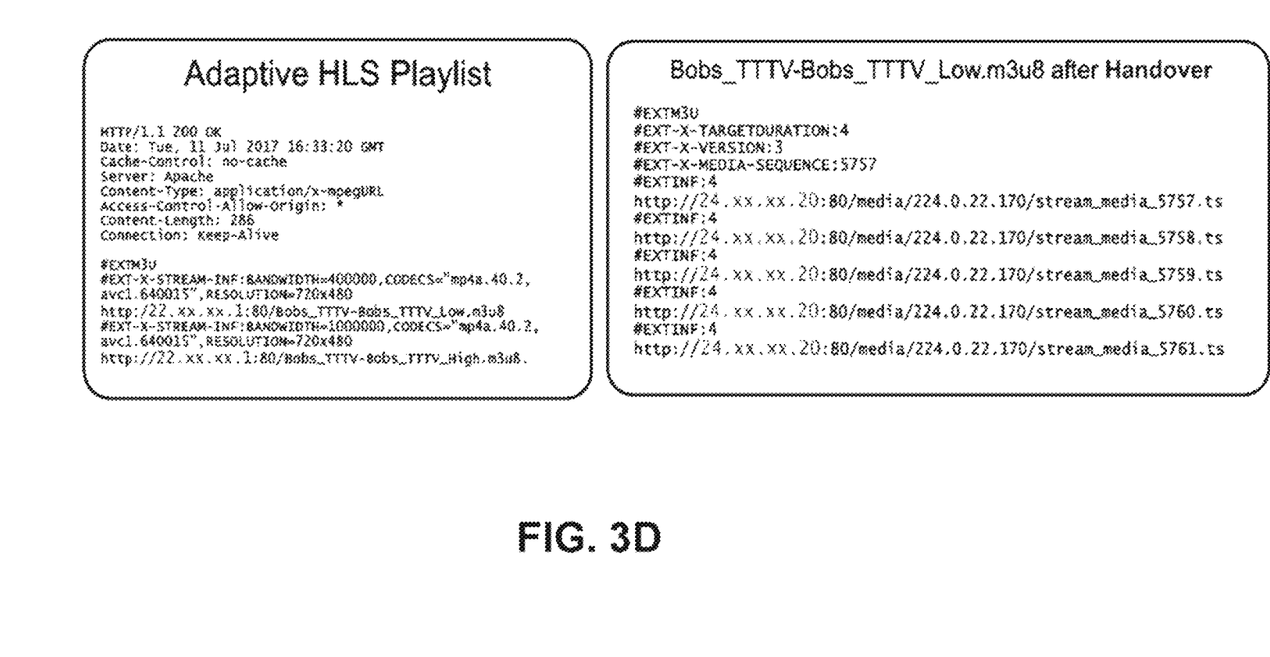
FIG. 3D is a representative illustration of an adaptive HLS playlist to be returned by an emulated HLS server.
Figure 3E:
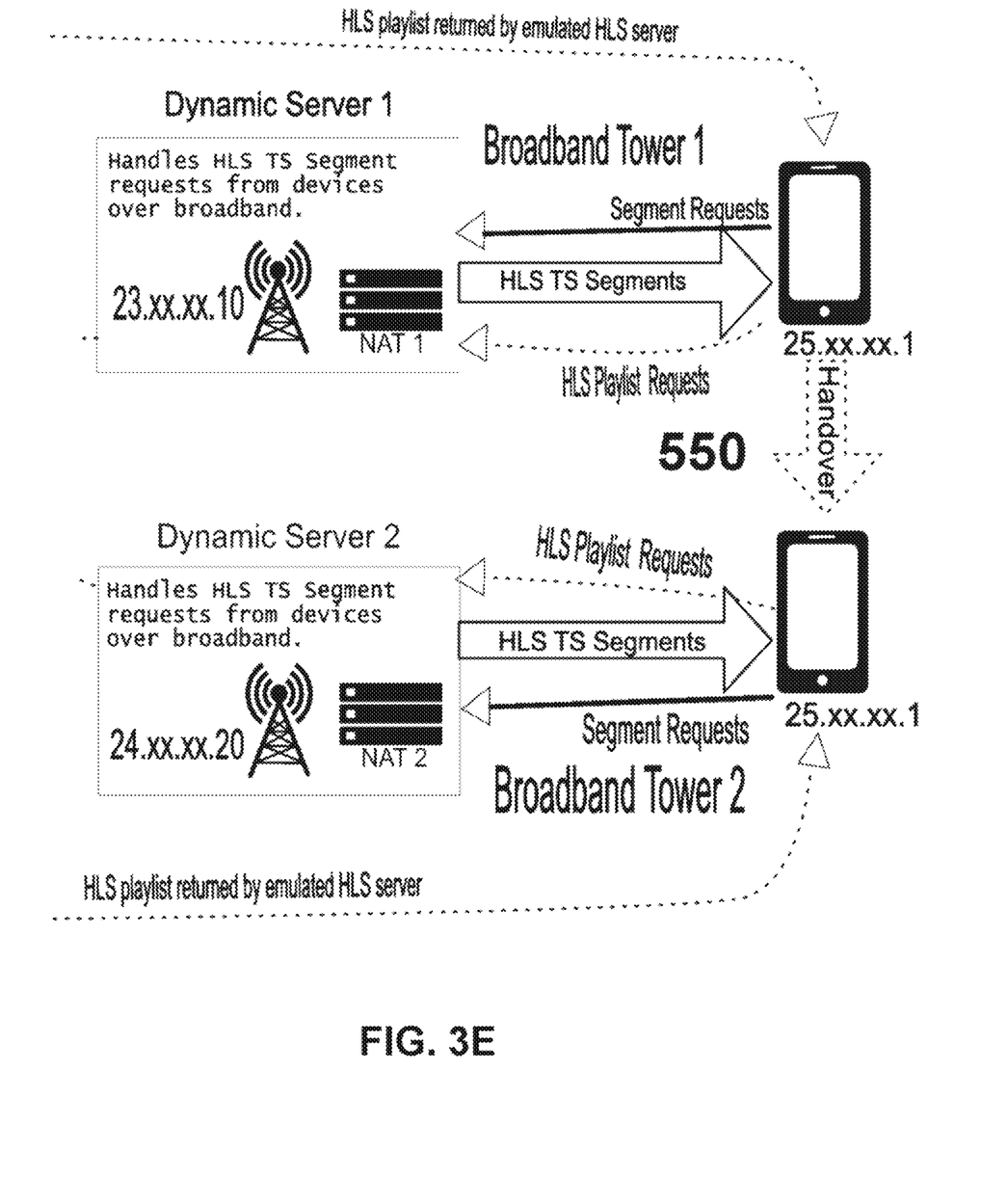
FIG. 3E is a representative illustration of a plurality of dynamic servers and broadband towers in communication with a user, and indicating a handover.

Turning to FIG. 2, and with further reference to the handover illustrated in FIGS. 3A-E, the process begins when an end user's browser queries a web site which preforms geographic location and an emulated adaptive bit rate server is assigned 100. The player makes an http "get" request to the emulated adaptive bit rate server 200. The emulated server to responds to HLS adaptive bit rate playlists requests recording the Internet Protocol address, time stamp, sequence (sort), and calculates this situational data to make informed updates to the adaptive bit rate playlist. The emulated adaptive bit rate server tracks and updates the content of the playlist for successive playlist requests. Emulated adaptive bit rate servers use lookup to find Internet addresses of downstream dynamic servers, or to create them if necessary. First the emulated adaptive bit rate server returns an adaptive-bit-rate playlist pointing to its own adaptive bit rate segments. The emulated adaptive bit rate server has the transport stream segments on hand and, unless the media is available according to a list of instantiated servers in a geographic area, an accelerated buffering command is sent to the localized server to instantiate a downstream server 300, and the first 10 seconds of ts segment data is dispatched directly from the emulated adaptive bit rate server. While the first 10 seconds of ts segment data is being sent to the player by the emulated adaptive bit rate server, a downstream dynamic emulated server is instantiated by the accelerated buffering command previously described 400. On subsequent playlist requests, the playlists are updated to substitute the dynamic server running on tower or gateway with a geographic location closer to the end user. Further http adaptive bit rate get requests are assigned via the updated dynamic server lookup, and a playlist is dispatched pointing the end user's media player to the dynamically instantiated server in the geographic area of the end user. The media player is completely unaware of any changes and continues to connect for playlists to the emulated adaptive bit rate server, for which the playlist data is very small, but the data intensive ts segments are pulled from the locally instantiated adaptive bit rate server which continues to serve the ts segments uninterrupted.

If a dynamically instantiated adaptive bit rate server should fail, the media player will itself seek the original source and a new server will be instantiated or assigned. This happens without interruption in the media player.

In wireless operation playlist requests from media players go through network address translators in the tower. In wireless handovers, the adaptive bit rate playlist requests are routed through network address translation (NAT) on towers or gateways 500 to discover the geographic locations of dynamic servers close to the end users. The NAT reveals the source of the request, which will have a server associated with it. A lookup is preformed to see if the requested channel is flowing at the tower or gateway. If so, the playlist file is immediately updated with the address (url) of the gateway or tower. In the case where the media is already running and a channel change occurs to a channel which also has the media running, the end user media player is immediately directed to the local geographic server.

In the event that the player is mobile and switches from one tower to another, due to a change in physical location during playback, the emulated HLS server reevaluates the best dynamic server with each playlist request. The player may retain its original IP address, but due to the use of a NAT in the dynamic server the emulated HLS server can determine which tower the player is currently connected. The emulated HLS server can then update the playlist to point to the new tower while starting the stream on that tower if necessary as described above. Certain players, such as on Mac/iOS are sensitive to a change in server for segment files which have already been presented in earlier playlist requests. For this reason the emulated HLS server tracks individual player sessions using a combination of request ID, user agent string and other identifiers. The emulated HLS server then uses this information to provide a smooth transition from one dynamic server to another by changing the source of segments slowly over the course of multiple playlist requests. If the new tower currently does not have the stream running and needs time to start the stream before providing the required segments then this transition happens multiple times. First the source of segments transitions to the emulated HLS server, which will always have the segments available. Then once the dynamic server on the new tower is ready to handle segment requests, the source of segments is smoothly transitioned from the emulated HLS server to the new dynamic server 550.

Figure 4:
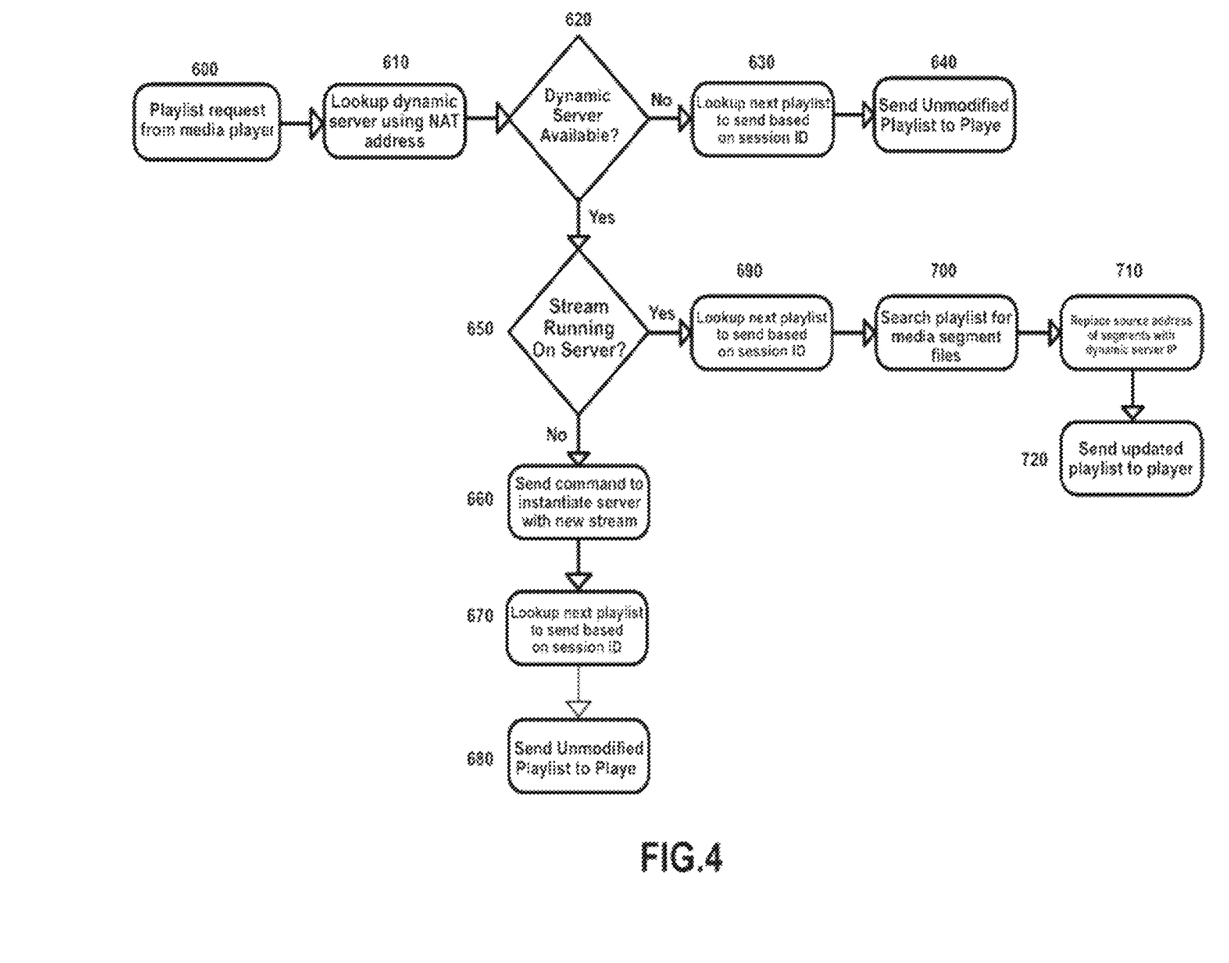
FIG. 4 is a flow diagram of a preferred method of operation of an embodiment of the invention.

Turning to FIG. 4, and with further reference to the handover illustrated in FIGS. 3A-E, the process begins when a user starts a video stream by loading a webpage with the video embedded 600. The video points to a playlist on the Emulated HLS server. The player then requests the playlist containing transport stream segment files from the Emulated HLS Server using a HTTP GET request. The request is forwarded to the Emulated HLS Server via NAT in the cell tower that the player is connected to.

The media player is able to hop to different towers based on the best signal, such as in a moving vehicle. The IP address of the player may be static and not change after the hop so the Emulated HLS Server uses the NATed address of the request as a lookup to determine which tower the player is currently connected on 610.

The Emulated HLS Server contains a table of cell towers that are capable of instantiating dynamic servers 620. The Emulated HLS Server performs a lookup of the tower using the NAT address to determine if the player is connected to a tower that supports instantiating dynamic servers.

The Emulated HLS Server uses the session ID provided in the HTTP GET request to determine the next playlist it should send for smooth playback. HLS playlists are updated every few seconds with new segment files. These playlists should be sent consecutively to the player without gaps or playback can skip. The Emulated HLS Server tracks sessions using the session ID to ensure it can send the next playlist in sequence 630.

The Emulated HLS Server sends the playlist without modification 640. An unmodified playlist contains segment files with no source address specified, known as a relative path. This causes the player to request the segment files from the same server as the playlist is located on, which in this case is the Emulated HLS server. This allows the player to receive the stream even from a tower that does not support dynamic servers.

Using the lookup done in 620 the Emulated HLS Server is able to determine if the stream requested by the player is currently running on the dynamic server. Streams that are running on a dynamic server are left running as long as there are media players actively requesting media files from that server. After a short timeout period of inactivity streams can be removed from the dynamic server and this is tracked by the Emulated HLS Server 650.

If it was determined that the stream was not available at the dynamic server a command is pushed to the server which tells the dynamic server to start receiving the stream to make it available locally on the tower 550. A server with no streams running takes little or no resources and merely waits for commands from the Emulated HLS Server. Once the 'stream start' command is received it wakes up the dynamic server and begins receiving the stream 660.

The Emulated HLS Server uses the session ID provided in the HTTP GET request to lookup the next playlist it should send for smooth playback. HLS playlists are updated every few seconds with new segment files. These playlists must be sent consecutively to the player without gaps or playback can skip. The Emulated HLS Server tracks sessions using the session ID to ensure it can send the next playlist in sequence 670.

It can take a few seconds for the dynamic server to receive the necessary stream files before it is able to take segment requests from the player. While the dynamic server instantiates and becomes ready, the Emulated HLS Server will handle segment requests. It will send the requested playlist file unmodified to the player. An unmodified playlist contains segment files with no source address specified, known as a relative path. This causes the player to request the segment files from the same server as the playlist is located on, which in this case is the Emulated HLS server 680.

The Emulated HLS Server uses the session ID provided in the HTTP GET request to determine the next playlist it should send for smooth playback. HLS playlists are updated every few seconds with new segment files. These playlists must be sent consecutively to the player without gaps or playback can skip. The Emulated HLS Server tracks sessions using the session ID to ensure it can send the next playlist in sequence 690.

The Emulated HLS Server will take the original playlist file and scan it, searching for the segment file URLs. The segment file URLs are relative paths with no specific server or port identified. The playlist files contain multiple segment URLs with numbered files. The player will use the URLs to request these segments and playback the stream 700.

For each segment file found in the playlist the Emulated HLS Server will prepend the URL with the dynamic server IP and port of the tower the player is currently connected on, as determined in step 710.

The Emulated HLS Server will send the modified playlist with the updated segment URLs back to the player that requested it. This will cause the player to request the segment files from the dynamic server on the tower that the player is currently connected on 720.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

I claim:

1. A method for delivering adaptive bit rate media over a broadband network comprising multiple towers and gateways, the method comprising:
   providing an emulated adaptive bit rate server;
   intercepting an adaptive bit rate playlist get request by the emulated adaptive bit rate server;
   when a requested video segment is flowing at one of the multiple towers, providing a modified adaptive bit rate playlist response to the adaptive bit rate playlist get request, wherein the modified adaptive bit rate playlist response identifies the tower as a source for the requested video segment;
   instantiating a plurality of dynamic downstream adaptive bit rate servers to serve the modified adaptive bit rate playlist response, by:
      transmitting, by the emulated adaptive bit rate server to the tower, an accelerated buffering command to instantiate one of the dynamic downstream adaptive bit rate servers; and
      while the one dynamic downstream adaptive bit rate server is being instantiated, transmitting, by the emulated adaptive bit rate server, a predetermined amount of transport stream segment data to the media player.

2. The method of claim 1, further comprising:
   determining a server outage for one or more of the plurality of dynamic downstream adaptive bit rate servers; and
   providing one or more additional adaptive bit rate servers on an optimized geographic basis.

3. The method of claim 1, further comprising:
   determining a server overload status for one or more of the plurality of dynamic downstream adaptive bit rate servers; and
   providing one or more additional adaptive bit rate servers on an optimized geographic basis.

4. The method of claim 1, further comprising:
   sensing a wireless handover based on an address change of a NAT translation in a tower or a gateway; and
   providing the plurality of dynamic downstream adaptive bit rate servers in response to the wireless handover.

5. The method of claim 1, wherein the emulated adaptive bit rate server sends an initial modified adaptive bit rate playlist response pointing to an adaptive bit rate segment server residing on the same Internet Protocol address substantially simultaneously with the step of instantiating the plurality of dynamic downstream adaptive bit rate servers.

6. The method of claim 1, further comprising translating, via a network address translator, the adaptive bit rate playlist get request to obtain the source of the get request.

7. A method in an adaptive bit rate server for delivering adaptive bit rate media over a broadband network comprising multiple towers and gateways, the method comprising:
   receiving an adaptive bit rate playlist request from a media player executing on a mobile device;
   determining, based on a network address translated IP address of the mobile device, a tower to which the mobile device is currently connected;
   determining whether the tower supports instantiating a dynamic adaptive bit rate server, by performing in a table a lookup of the tower using the network address translated IP address to determine if the media player is connected to a tower that supports instantiating dynamic servers, wherein the table identifies cell towers that are capable of instantiating dynamic adaptive bit rate servers;

determining, based on the lookup of the network address translated IP address, whether a requested video stream is currently running on the dynamic adaptive bit rate server; and when the requested video stream is not currently running on the dynamic adaptive bit rate server, transmitting a command to instantiate the dynamic adaptive bit rate server to make the requested video stream available on the tower.

8. The method of claim 7, further comprising:
while the dynamic adaptive bit rate server is being instantiated, transmitting an unmodified playlist to the media player, wherein the unmodified playlist identifies the emulated adaptive bit rate server as the source of the requested stream; and
once the dynamic adaptive bit rate server is instantiated, transmitting a modified playlist to the media player, wherein the modified playlist identifies the dynamic adaptive bit rate server as the source of the requested media stream.

9. The method of claim 7, further comprising:
when the tower does not support instantiating a dynamic adaptive bit rate server, transmitting an unmodified playlist to the media player, wherein the unmodified playlist identifies the emulated adaptive bit rate server as the source of the requested stream.

10. The method of claim 9, further comprising:
determining a next unmodified playlist to transmit based on a session ID found in the adaptive bit rate playlist request.

11. The method of claim 7, further comprising:
when the requested video stream is currently running on the dynamic adaptive bit rate server,
determining a next playlist to send to the media player;
scanning the playlist for video segment source identifiers;
updating each video segment source identifier to identify the tower as the source of the video segment; and
transmitting to the media player a modified playlist that includes the updated video segment source identifiers.

12. The method of claim 11, wherein the scanned video segment source identifiers are URLs.

13. The method of claim 12, wherein the scanned URLs are relative paths with no specific server or port identified.

14. The method of claim 11, wherein the updated videos segment source identifiers are URLs that include the IP address and port of the tower.

15. A system for delivering adaptive bit rate media over a broadband network comprising multiple towers and gateways, the system comprising:
a mobile computing device executing a media player; and
an emulated adaptive bit rate server computing system, configured to:
receive an adaptive bit rate playlist request from the media player;
determine a tower to which the mobile device is currently connected;
determine whether the tower supports instantiating a dynamic adaptive bit rate server;
determine whether a requested video stream is currently running on the dynamic adaptive bit rate server; and
when the requested video stream is currently running on the dynamic adaptive bit rate server,
determine a next playlist to send to the media player;
scan the playlist for video segment source identifiers;
update each video segment source identifier to identify the tower as the source of the video segment; and
transmit to the media player a modified playlist that includes the updated video segment source identifiers.

16. The system of claim 15, wherein the adaptive bit rate server computing system is further configured to:
when the requested video stream is not currently running on the dynamic adaptive bit rate server,
transmit to the tower a command to instantiate the dynamic adaptive bit rate server to make the requested video stream available on the tower;
while the dynamic adaptive bit rate server is being instantiated, transmit an unmodified playlist to the media player, wherein the unmodified playlist identifies the emulated adaptive bit rate server as the source of the requested stream; and
once the dynamic adaptive bit rate server is instantiated, transmit a modified playlist to the media player, wherein the modified playlist identifies the dynamic adaptive bit rate server as the source of the requested media stream.

17. The system of claim 15, wherein the adaptive bit rate server computing system is further configured to:
determine, based on a network address translated IP address of the mobile device, the tower to which the mobile device is currently connected;
determine, based on a lookup of the network address translated IP address, whether the tower supports instantiating the dynamic adaptive bit rate server; and
determine, based on the lookup of the network address translated IP address, whether the requested video stream is currently running on the dynamic adaptive bit rate server.

18. The system of claim 15, wherein the media player executing on the mobile computing device receives a sequence of multiple playlists from the emulated adaptive bit rate server while receiving video transport stream segments from one or more dynamic adaptive bit rate severs based on the geographic location of the mobile computing device.

19. The system of claim 15, wherein the modified playlist includes the IP address of the dynamic adaptive bit rate server prepended to one or more video transport stream URLs.

20. The system of claim 15, wherein the video segment source identifiers are segment file URLs that are relative paths with no specific server or port identified, wherein the playlist contains multiple segment file URLs identifying numbered files, and wherein the emulated adaptive bit rate server computing system is further configured to prepend each URL with a dynamic server IP and port of the tower to which the player is currently connected.

* * * * *